United States Patent
Famy et al.

(10) Patent No.: US 7,128,965 B2
(45) Date of Patent: Oct. 31, 2006

(54) CEMENTITIOUS PRODUCT IN PANEL FORM AND MANUFACTURING PROCESS

(75) Inventors: Charlotte Famy, Chantilly (FR); Gaël Cadoret, Paris (FR); Paul Houang, Paris (FR); Valdir Aparecido Zampieri, Sao Paulo (BR)

(73) Assignee: Saint-Gobain Materiaux de Construction S.A.S., Courbevoie (FR)

( * ) Notice: Subject to any disclaimer, the term of this patent is extended or adjusted under 35 U.S.C. 154(b) by 0 days.

(21) Appl. No.: 10/691,638

(22) Filed: Oct. 24, 2003

(65) Prior Publication Data

US 2005/0072056 A1    Apr. 7, 2005

(30) Foreign Application Priority Data

Oct. 2, 2003    (FR)    ................................. 03 11579

(51) Int. Cl.
*B32B 27/12* (2006.01)

(52) U.S. Cl. ............................. 428/297.4; 428/294.7; 428/296.4; 428/454; 428/404; 428/32.5; 428/332; 106/738

(58) Field of Classification Search .................... 52/21; 428/297.4, 294.7, 296.4, 454, 404, 325, 332; 106/738
See application file for complete search history.

(56) References Cited

U.S. PATENT DOCUMENTS

| | | | |
|---|---|---|---|
| 4,101,335 A * | 7/1978 | Barrable | |
| 4,132,555 A * | 1/1979 | Barrable | |
| 4,306,911 A * | 12/1981 | Gordon et al. | |
| 4,377,415 A * | 3/1983 | Johnson et al. | |
| 4,428,775 A * | 1/1984 | Johnson et al. | |
| 4,543,159 A * | 9/1985 | Johnson et al. | |
| 4,840,672 A * | 6/1989 | Baes | |
| 5,795,515 A | 8/1998 | Fischer | |
| 6,139,620 A * | 10/2000 | Suzuki et al. | 106/672 |
| 6,203,609 B1 * | 3/2001 | Castro et al. | 106/705 |
| 6,346,146 B1 * | 2/2002 | Duselis et al. | 106/713 |
| 6,506,248 B1 * | 1/2003 | Duselis et al. | 106/713 |
| 6,572,697 B1 * | 6/2003 | Gleeson et al. | 106/705 |
| 6,676,744 B1 * | 1/2004 | Merkley et al. | 106/674 |
| 6,676,745 B1 * | 1/2004 | Merkley et al. | 106/726 |
| 6,749,897 B1 * | 6/2004 | Naji et al. | 427/350 |
| 6,777,103 B1 * | 8/2004 | Merkley et al. | 428/532 |

FOREIGN PATENT DOCUMENTS

| | | | |
|---|---|---|---|
| DE | 253421 | * | 12/1988 |
| EP | 263723 | * | 4/1988 |
| EP | 0 846 666 | | 6/1998 |
| JP | 62223046 | * | 10/1987 |
| WO | WO 02/070425 | | 9/2002 |

OTHER PUBLICATIONS

*Wood-Cement Composites in the Asia-Pacific Region*, Proceedings of a workshop held at Rydges Hotel, Canberra, Australia, on Dec. 10, 2000, Chapters 1-3, pp. 1-46, 48-128, and 130-165.

* cited by examiner

*Primary Examiner*—Paul Marcantoni
(74) *Attorney, Agent, or Firm*—Oblon, Spivak, McClelland, Maier & Neustadt, P.C.

(57) ABSTRACT

The present invention relates to a product, in particular a panel, that can be obtained by the Hatschek process and without autoclaving, and can be used as siding, cladding element or partition element, this product being formed from a fibre-reinforced cementitious matrix comprising at least one hydraulic binder, such as cement, at least one filler, such as calcium carbonate, and at least synthetic fibres. The invention also relates to a process for manufacturing the product.

5 Claims, No Drawings

CEMENTITIOUS PRODUCT IN PANEL FORM AND MANUFACTURING PROCESS

The present invention relates to the field of the manufacture of products based on cement (generally Portland cement) or other hydraulic binder reinforced with fibres. It relates more particularly to the manufacture of products in panel (or sheet or plate or slab or board) form, that can be used as building elements, especially as sidings, cladding (or boarding) elements or partition elements.

These products are usually manufactured using a wet papermaking technique that utilizes the presence of the fibres in the mixture. This technique consists in forming a sheet likenable to a paper, by filtration using a fluid aqueous suspension obtained by essentially mixing cement, fibres and water; the sheet, or possibly a superposition of sheets, then being drained of water by suction and/or pressure. The fibres, generally cellulose fibres, hold to the filter (or sieve), forming an additional screen or filter mesh, the mesh cells of which have a size suitable for retaining the particles, even fine particles, of cement or of other binder or additive, together with an important amount of water which contributes to the cohesion of the thick layer being formed on the screen.

In one particular technique, the filter (or sieve) consists of a drum covered with a filter cloth (or felt) installed in a tank (or vat) containing the suspension; since the drum rotates in the tank, the hydrostatic pressure forces some of the water to pass through the felt, whereas the solids, that is to say notably the cellulose fibres, the cement particles and other additives, build up on the screen of the drum as a thin layer whose thickness increases with the rotation of the drum. This is known as the Hatschek technique.

This technique is used to manufacture various types of product, such as roofing panels, sidings, cladding elements, etc., these various types of product each having to meet particular requirements. Thus, the roofing products must mainly have good mechanical strength properties, whereas the sidings, cladding elements or partition elements that are intended to be nailed generally have slightly lower mechanical strength properties while at the same time having stricter dimensional stability characteristics (shrinkage values) (especially to avoid the appearance of cracks at the nails).

The use of an autoclaving step at high temperature (above 150° C.) and high pressure (saturation pressure of the order of a few bar) on products coming from the Hatschek process generally makes it possible to limit the shrinkage characteristics (small dimensional variation according to the variation in moisture content). Although good roofing products, that are less strict in terms of dimensional stability performance levels, have been obtained without using this autoclaving operation, it has not hitherto been possible to obtain good products that can be used as sidings or cladding elements or partition elements by the Hatschek technique without carrying out an autoclaving step or without using formulations that are complex, demanding in terms of maintenance, or expensive.

The objective of the present invention was therefore to develop a novel product that can be obtained, with a lower cost, by the Hatschek process and without autoclaving, this product having satisfactory mechanical properties and/or dimensional stability performance, particularly those that are appropriate for its use as siding cladding element or partition element.

This objective has been achieved by the product of the invention, this product being in particular in the form of a panel, being able to be obtained by the Hatschek process and without autoclaving, and being able to be used as siding, cladding element or partition element, the said product comprising at least one hydraulic binder, such as cement, at least one filler, such as calcium carbonate, and at least synthetic fibres, such as polyvinyl alcohol or polyolefin fibres.

The term "synthetic fibres", as opposed to natural fibres such as cellulose fibres, is understood to mean fibres obtained by synthesis (involving a man-controlled chemical reaction), especially organic fibres, in particular those coming from petroleum derivatives, these fibres generally being meltable and being formed from at least one polymer, particularly a thermoplastic polymer, such as a polyvinyl alcohol or a polyolefin. Preferably, these fibres are polyvinyl alcohol (PVA) fibres or advantageously polypropylene (PP) fibres or possibly polyethylene (PE) fibres.

The product according to the invention is able to be obtained by the Hatschek process, that is to say from a sheet material obtained in particular by filtration, on a screen or filter, of an aqueous suspension (this suspension comprising, in the present invention, the constituents defined above, that is to say at least one hydraulic binder, one filler and synthetic fibres as defined above), thicknesses of the said sheet material thus obtained being, where appropriate, superposed until the desired final thickness is obtained, in order to obtain a panel. The panel may furthermore be drained of water by suction and/or pressed (notably in order to adjust the density and/or to print a decorative pattern), for example by a forming drum or 'format' roll (generally on which the thicknesses of the sheet material, which is driven by the felt and wound around this forming drum, are superposed) or a static mechanical press, and/or undergo a curing (or maturing) step, generally in an oven at low temperature (for example around 60° C.) and/or in the open air. The product according to the invention advantageously has the desired properties without requiring the use of an autoclaving step.

The product according to the invention, thus obtained generally in the form of a panel resulting from one or more sheets formed by filtration of an aqueous suspension according to the above description, is therefore formed from a fibre-reinforced cementitious matrix, this matrix including the constituents mentioned in the definition of the invention, this matrix or this product optionally being provided with other elements, particularly those added on the panel obtained according to the above process, such as decorations (coat of paint, printing, etc.), fittings or fastening means, etc.

In accordance with the definition of the invention, the product according to the invention comprises at least one hydraulic binder, such as cement, this is in general Portland cement. The content of the said binder or cement in the suspension used to obtain the product as explained above is preferably between 18 and 75% advantageously between 18 and 65%, by weight relative to the total weight of dry matter (the weight contents or values hereafter, in the suspension, being always given by weight of dry matter relative to the total weight of dry matter).

The product according to the invention also includes at least one filler, advantageously an inert or weakly reactive mineral filler, such as calcium carbonate. Preferably, this filler is present in amounts ranging between 18 and 75% by weight in the suspension.

The product according to the invention also includes synthetic fibres, such as mentioned above. Advantageously, these fibres are present in an amount of between 0.5 and 10% by weight in the suspension and can be in a more or less dispersed or bond form. Preferably, these fibres are chosen so as to have a diameter of 5 to 16 μm (generally 10 to 15 μm) and are short fibres (having a length of less than a few centimetres), and in particular are chosen so as to have a length from 3 to 15 mm (for example from 3 to 8 mm or even 4 to 7 mm, in the case of PVA fibres, and from 5 to 15 mm, or even 6 to 12 mm in the case of PP fibres). Also preferably, these fibres are chosen so as to have a tensile strength (or tenacity) of at least 400 MPa (in particular, at least 500 MPa in the case of PP fibres and at least 800 MPa, or even 900 MPa, in the case of PVA fibres), a Young's modulus of at least 400 GPa (in particular, at least 6 GPa in the case of PP fibres and at least 20 GPa in the case of PVA fibres) and an elongation of between 6 and 40% (in particular, between 6 and 12% or even between 7 and 11%, in the case of PVA fibres and between 15 and 25%, or even between 17 and 20%, in the case of PP fibres), these values being measured according to the DIN 53816 standard.

In general, the product according to the invention also includes, in combination with the abovementioned fibres, at least plant fibres, especially cellulose fibres, in particular bleached or unbleached fibres, preferably refined to an SR (Schopper-Riegler) degree of about 40 to 70, or even 55 to 65, particularly from pine, but also from sisal or other, the total fibre content (including the synthetic fibres and the optional cellulose fibres) preferably not exceeding 10% by weight in the suspension.

Part of the cement may also be replaced with at least one reactive material capable of reacting with the cement, notably with formation of calcium silicate, in particular replaced with at least one pozzolan (or pozzolana) or material capable of undergoing a pozzolanic reaction. This pozzolan (or material capable of undergoing a pozzolanic reaction) is preferably chosen from aluminosilicates, calcium aluminosilicates and amorphous silica and is particularly preferably metakaolin, which is a dehydroxylated form of aluminium silicate, and/or fly ashes from thermal power stations, which are materials of the aluminosilicates type or calcium aluminosilicates type (type F or C according to the ASTM C618 standard), and/or another reactive material of the type of rice husk ashes, which are based on an amorphous form of silica, and/or also possibly slag (blastfurnace slag) from ironwork, which is a material of the calcium aluminosilicate type.

Preferably, this pozzolan, used in powder form, has a particle size distribution characterized by a mean diameter ($D_{50}$) of greater than 1 μm and less than or equal to 50 μm, advantageously about 10 to 30 μm. This powder generally also has a specific surface area of about 10 to 50 $m^2/g$ (measured by the BEST method).

Advantageously, the total content of cement (or binder) and of optional pozzolan (or material capable of undergoing a pozzolanic reaction) does not exceed 75% by weight, preferably does not exceed 65% by weight and more particularly preferably does not exceed 60% by weight in the suspension, the cement/pozzolan weight ratio preferably being greater than or equal to 2. The embodiment that combines (among the constituents defined according to the invention) the cement with the pozzolan favours for the final product the obtaining of improved mechanical properties, while allowing to obtain relatively satisfactory dimensional stability performance levels. In parallel, both good results in terms of dimensional stability and quite satisfactory results in terms of mechanical properties are obtained, independently of the presence or not of the pozzolan, when a limited cement content (of between 18 and 55% and preferably between 20 and 50%) is combined with a rather high calcium carbonate (or filler) content (of between 30 and 70% and preferably between 35 and 65%), as illustrated later on.

The product according to the invention may also include additives, such as kaolin and/or flocculants and/or other adjuvants of the aqueous suspension, etc.

In one particularly preferred embodiment, the suspension comprises:

from 20 to 50%, advantageously from 25 to 45%, by weight of hydraulic binder (or cement);

from 35 to 65%, advantageously from 38 to 62%, by weight of inert or weakly reactive mineral filler (or calcium carbonate);

from 2 to 10%, advantageously from 3 to 8%, by weight of fibres, at least some of which are synthetic fibres;

from 0 to 30%, advantageously from 0 to 25%, by weight of pozzolan (or material capable of undergoing a pozzolanic reaction);

from 0 to 10%, especially from 0 to 5%, by weight of additives;

the content of binder (or cement) and pozzolan preferably being less than 60% and the cement/pozzolan ratio being greater than or equal to 2.

Preferably the content of synthetic fibres is at least 1% by weight in the suspension or at least 25% by weight relative to the total weight of fibres (the optional other fibres being advantageously cellulose fibres) and particularly preferably the content of synthetic fibres represents from 1 to 5%, or even from 1.5 to 4%, by weight in the suspension.

The product according to the invention is advantageously in the form of a siding, a cladding element or a partition element (or is intended to be used as such).

The subject of the invention is also a process for manufacturing the product according to the invention, characterized in that a sheet material is prepared by filtration, on a screen (or filter or sieve), of an aqueous suspension as defined above, thicknesses of the said sheet material are superposed if need be until the desired final thickness is obtained in order to give a panel, and optionally the panel is subjected to a suction draining and/or mechanical pressing step (for example by the forming drum on which the thicknesses are superposed as explained beforehand and/or by a press) and/or to a curing (or maturing) step, generally carried out at a few tens of degrees (for example 60°) in an oven for a few hours (for example 8 hours) and/or in the open air.

Optionally, the panel may undergo other treatments, for example it may be formed and/or printed and/or decorated, for example moulded, notably when it is still in a malleable form (for example during the pressing operation), in particular in order to obtain a corrugated or non-planar panel, a panel with the appearance of wood, etc.

The following examples illustrate two formulations of products according to the invention and the mechanical and dimensional stability properties of the said products.

EXAMPLE 1

In this example, the matrix was produced from the following composition by weight of dry matter:
- 34.7% of standardized (CEM I 52.5) Portland cement;
- 60% of calcium carbonate;
- 2.3% of PVA fibres supplied by Lanzhou; and
- 3% of bleached pine cellulose fibres refined to 60° Schopper-Riegler.

EXAMPLE 2

In this example, the matrix was produced from the following composition by weight of dry matter:
- 39.7% of standardized (CEM I 52.5) Portland cement;
- 40% of calcium carbonate;
- 2.3% of PVA fibres supplied by Kuraray;
- 3% of bleached pine cellulose fibres refined to 60° Schopper-Riegler; and
- 15% of fly ashes sold by Pozo Fly Comercio de Cinzas Lima Ltda.

Manufacture of the Specimens

The fibre cement panels were manufactured by the Hatschek process. In particular, a dilute aqueous suspension (the dilution being for example around 50 to 200 g of dry matter per litre of water, as is usual in the Hatschek technique) of the compositions indicated above was prepared, 0.04% of anionic polyacrylamide flocculent relative to the weight of dry matter of the above constituents being added.

The manufactured panels had a length of about 2.5 to 3.6 m, a width of 1.2 to 1.5 m and a thickness of approximately 8 mm. They were formed from several monolayers (generally between 7 and 9 monolayers) that were superposed in the fresh state and obtained using the dilute fibrous cement suspension described above in the abovementioned Hatschek line, these monolayers being superposed in order to form a panel, and the said superposition or panel being pressed by a forming drum (on which the layers are superposed by winding of the material obtained by filtration of the suspension and brought by a felt) so as to remove a certain amount of water and to increase the adhesion of the monolayers to one another, the superposition being cut in order to obtain the panel with the required dimensions.

Cure (Maturing)

The pressed panels were cured in an oven at 60° C. and 100% relative humidity for 8 hours. The panels were then stored for 28 days in order to complete their cure. At the end of cure, the panels were cut up and characterized as follows.

Characterization:

The characterization of the panels was carried out on the model of the procedures specified in the ISO 8336 standard.

Determination of the Three-point Bending Strength or MOR (Modulus of Rupture):

The bending strengths were determined, on the one hand, on test pieces (or samples) immersed for 24 hours in water at 20° C. (saturated MOR) and, on the other hand, on test pieces dried in a laboratory atmosphere at 20° C. and 60% relative humidity (dry MOR). The final bending strength value is an average from ten test pieces. The bending strength is regarded as sufficient for use as siding, cladding element or partition element when the saturated MOR value is greater than 7 MPa and when the dry MOR value is greater than 10 MPa.

Shrinkage or Moisture Movement:

The length of the test piece was measured after it had been immersed in water for 48 hours and after it had been dried at 105° C. in an environmental chamber. The length of the test piece dried at 105° C. was measured when the mass of the test piece was constant to within 0.1%. The final shrinkage value was a mean value from three test pieces. The shrinkage value is regarded as particularly satisfactory for use as siding, cladding element or partition element when it is less than or equal to 0.2%.

The results of the evaluations are given in Table 1 below.

TABLE 1

| Ex. | Cement (%) | CaCo$_2$ (%) | PVA (%) | Cellulose (%) | Fly ashes (%) | Dry MOR (MPa) | Saturated MOR (MPa) | Shrinkage (%) |
|---|---|---|---|---|---|---|---|---|
| 1 | 34.7 | 60 | 2.3 | 3 | 0 | 14.7 | 9.2 | 0.18 |
| 2 | 39.7 | 40 | 2.3 | 3 | 15 | 15.4 | 10.3 | 0.20 |

The panels prepared from formulations 1 and 2 have shrinkage values that are satisfactory for their use as sidings, cladding elements or partition elements, as well as good mechanical properties, also satisfactory for their use as sidings, cladding elements or partition elements.

The product according to the invention may be used as siding, cladding element or partition element, etc. and may be flat or corrugated, etc.

The invention claimed is:

1. A flat panel obtained by the Hatschek process from a sheet material obtained by filtration of an aqueous suspension comprising:
   a Portland cement in an amount of between 18 to 50% by weight of dry matter,
   calcium carbonate in an amount of between 60 to 70% by weight of dry matter, and
   from 2 to 10% by weight of fibers, at least some of which are synthetic fibres,
   said flat panel being obtained without autoclaving.

2. The flat panel according to claim 1, wherein said suspension further includes plant fibres.

3. The flat panel according to claim 1, wherein the content of synthetic fibres is at least 1% by weight relative to the total weight of dry matter or at least 25% by weight relative to the total weight of fibres.

4. The flat panel according to claim 1, wherein the synthetic fibres comprise at least one of polyvinyl alcohol fibres, polypropylene fibres and polyethylene fibres.

5. The flat panel according to claim 1, in the form of a siding, a cladding element, or a partition element.

* * * * *

UNITED STATES PATENT AND TRADEMARK OFFICE
CERTIFICATE OF CORRECTION

PATENT NO. : 7,128,965 B2  
APPLICATION NO. : 10/691638  
DATED : October 31, 2006  
INVENTOR(S) : Charlotte Famy et al.

It is certified that error appears in the above-identified patent and that said Letters Patent is hereby corrected as shown below:

Column 1, line 66, " use as sliding cladding element"
should read -- use as siding, cladding element --.

Column 2, line 58, " 18 and 75% advantageously "
should read -- 18 and 75%, advantageously --.

Column 3, line 16, " least 400 GPa "
should read -- least 4 GPa --.
line 56, " (measured by the BEST method). "
should read -- (measured by the BET method). --

Signed and Sealed this

Eighth Day of May, 2007

JON W. DUDAS  
*Director of the United States Patent and Trademark Office*